(12) United States Patent
Malinowski et al.

(10) Patent No.: US 8,032,725 B1
(45) Date of Patent: Oct. 4, 2011

(54) BACKUP DATA MANAGEMENT ON A FRACTIONALLY RESERVED STORAGE SYSTEM

(75) Inventors: Pawel Malinowski, Fall City, WA (US); Michael Mankovsky, Gilroy, CA (US)

(73) Assignee: NetApp, Inc., Sunnyvale, CA (US)

( * ) Notice: Subject to any disclaimer, the term of this patent is extended or adjusted under 35 U.S.C. 154(b) by 722 days.

(21) Appl. No.: 11/686,197

(22) Filed: Mar. 14, 2007

Related U.S. Application Data

(63) Continuation-in-part of application No. 11/668,760, filed on Jan. 30, 2007.

(51) Int. Cl.
*G06F 12/00* (2006.01)
(52) U.S. Cl. .................................. 711/162; 711/163
(58) Field of Classification Search .................... 711/162
See application file for complete search history.

(56) References Cited

U.S. PATENT DOCUMENTS

| | | | |
|---|---|---|---|
| 6,397,348 B1 * | 5/2002 | Styczinski ................. | 714/6 |
| 7,373,364 B1 | 5/2008 | Chapman | |
| 2001/0054121 A1 * | 12/2001 | Proch et al. ................. | 710/57 |
| 2003/0112685 A1 * | 6/2003 | Duh et al. ................... | 365/221 |
| 2006/0117157 A1 * | 6/2006 | Kitamura .................... | 711/163 |
| 2007/0043737 A1 * | 2/2007 | Nagamatsu et al. .......... | 707/10 |
| 2009/0144499 A1 * | 6/2009 | Nicholson et al. ........... | 711/118 |

OTHER PUBLICATIONS

Laplander et al. nanoBackup. Northern Arizona University, Aug. 3, 2005 [online], [retrieved on Jun. 11, 2009]. Retrieved from the Internet <URL: https://www4.nau.edu/its/mensa/services/Software/nanoBackup/>.*
Smoot et al. "Method and System of Automatically Monitoring a Storage Server", U.S. Appl. No. 11/366,042, filed Mar. 1, 2006, 36 pages.
Aggarwal et al. "System and Method for Flexible Space Reservations in a File System Supporting Persistant Consistency Point Images", U.S. Appl. No. 10/991,225, filed Nov. 17, 2004, 43 pages.
Malinowski et al. "Backup Data Management on a Fractionally Reserved Storage System", U.S. Appl. No. 11/668,760, filed Jan. 30, 2007, 40 pages.

* cited by examiner

*Primary Examiner* — Reginald Bragdon
*Assistant Examiner* — Larry Mackall
(74) *Attorney, Agent, or Firm* — Cesari and McKenna, LLP

(57) ABSTRACT

Embodiments of the present invention provide a mechanism by which a server system executing a host application monitors utilization of overwrite reserve space on a volume storing application data. The server system executes space reservation policies to ensure that the volume cannot run out of space due to snapshot creation. In one implementation, the server system initiates deletion of backup datasets stored on the volume if certain criteria provided by a system administrator are met. If deleting backup datasets cannot not stop the volume from running out of space due to continuous snapshot creation, the server system prevents the host application from temporarily issuing I/O requests to the storage system until space is recovered. Preventing the host application from issuing I/O requests, rather than failing I/O requests by the storage system, eliminates undesirable consequences, such as loss of data and the need to perform data recovery.

30 Claims, 8 Drawing Sheets

BACKUP DATA MANAGEMENT ON A FRACTIONALLY RESERVED STORAGE SYSTEM

RELATED CASES

This Application for United States Patent is a Continuation in Part (CIP) of copending Application for U.S. patent Ser. No. 11/668,760 filed on Jan. 30, 2007.

FIELD OF THE INVENTION

Embodiments of the present invention relate to storage systems, and in particular, to storage systems supporting fractional space reservation.

BACKGROUND

A storage system is a processing system adapted to store and retrieve data on behalf of one or more client processing systems ("clients") in response to external input/output (I/O) requests received from clients. A storage system can provide clients with a file-level access to data stored in a set of mass storage devices, such as magnetic or optical storage disks or tapes. Alternatively, a storage system can provide clients with a block-level access to stored data, rather than file-level access or with both file-level access and block-level access.

Data storage space has one or more storage "volumes" comprising of physical storage disks, defining an overall logical arrangement of storage space. The disks within a volume/file system are typically organized as one or more groups of Redundant Array of Independent (or Inexpensive) Disks (RAID).

Application data sent to a storage system from a client system for storage may be divided up into fixed-size physical data blocks (for example, data blocks A, B, and C) stored on disks within a volume. To facilitate access to the data blocks, the storage system implements a file system that logically organizes information as a hierarchical structure of named directories and files on the disks. Some known file systems, including Write Anywhere File Layout (WAFL™) file system, provided by Network Appliance, Inc., of Sunnyvale, Calif., provide capability for creating snapshots of an active file system. An "active file system" is a file system to which data can be both written and read. The snapshot is a persistent point in time (PPT) image of the active file system that enables quick recovery of data after data has been corrupted, lost, or altered. The PPT image and a "snapshot" shall be used interchangeably throughout this description. Snapshots can be created by copying the data at each predetermined point in time to form a consistent image, or virtually by using a pointer to form the image of the data.

When pointers are used for snapshot creation, the created snapshot points to the data blocks in the active file system, such as data blocks A, B, and C. If one data block, e.g., data block C, is modified, a new data block (for example, data block C') is allocated for new data and the new data block is written at a new location on a disk. Now the file system points to the new data block C' as well as to the data blocks A and B. The file system terminates the link to the old data block C. Although data block C was modified, it is now being locked by the snapshot and cannot be de-allocated for new data until the snapshot is deleted. Thus, when blocks in the active file system are modified or removed, new blocks are added into the active file system. The old blocks, although removed from the active file system, are still being held by some snapshots and physically maintained on disk within the volume. This consumes space on the volume and causes the snapshot area to grow.

To ensure that there is enough space on the volume to modify all application data, overwrite reserve space is allocated on the volume in addition to the originally estimated amount of space required for the application data. For example, if 100 MB is estimated to be needed by application data, and a 100% overwrite reserve ratio is chosen, the total amount of required space is 200 MB (100 MB+100 MB*100%). This technique is called 100% overwrite space reservation. A noted problem with this technique is that by maintaining overwrite reserve equal to the amount of space allocated for the application data, the amount of available space on the volume that can potentially be consumed by snapshots and other data is decreased.

According to another technique, a fraction of the space allocated for the application data on a volume is reserved for overwrite space protection. Fractional space reservation leaves more space on the volume for snapshot consumption and other data. A fractional reserve percentage value is set depending on the average rate of change of data on a volume. A disadvantage of fractional space reservation is that configuring less than 100% for overwrite reserve space creates the possibility that at some point application data cannot be modified because there is not enough space on the volume for modifying the data, and old data blocks locked by the snapshots. Thus, using fractional space reservation requires continuous monitoring of overwrite reserve space on a volume.

According to one known technique, a component of a storage system monitors available space on a fractionally-reserved volume. A write operation from a client system executing a host application is rejected if there is not enough space on the volume to complete the operation. This technique is described in a commonly-assigned U.S. patent application Ser. No. 10/991,225, entitled "SYSTEM AND METHOD FOR FLEXIBLE SPACE RESERVATIONS IN A FILE SYSTEM SUPPORTING PERSISTENT CONSISTENCY POINT IMAGES," by Himanshu Aggarwal and Eric Hamilton, the contents of which are incorporated by reference herein. Thus, according to this technique, the client system continues to issue I/O requests to the storage system even when there is not available space on the volume. These requests are rejected by the storage system. Rejecting client I/O requests may lead to undesirable consequences, such as loss of data. In addition, the client system halts execution of an application, which may result in performing additional steps by an application administrator, such as recovering application data and restoring the application.

Accordingly, what is needed is a mechanism that allows a client executing a host application to monitor utilization of overwrite reserve space on a volume storing application data as to prevent the host application from issuing I/O requests when there is not enough space on the volume to execute the requests.

SUMMARY

Embodiments of the present invention provide a mechanism by which a server system executing a host application monitors utilization of fractionally reserved overwrite space on a volume storing application data. The server system executes space reservation policies to ensure that the volume cannot run out of space due to snapshot creation. In one implementation, the server system initiates deletion of backup datasets stored on the volume if certain criteria provided by a system administrator are met. A backup dataset may include one or more snapshots of application data. A backup dataset may also include a log of changes to the data and metadata describing the backup dataset. Since deletion of backup datasets on the volume is initiated by the server system, which maintains knowledge about stored backup datasets, the server system may use various rules to decide which backup datasets should be deleted to recover space on the volume and which data needs to be retained. If deleting backup datasets cannot stop the volume from running out of space due to continuous snapshot creation, the server system prevents the host application from temporarily issuing I/O requests to the storage system until space is recovered. Preventing the host application from issuing I/O requests, rather than failing I/O requests by the storage system, eliminates undesirable consequences, such as loss of data and the need to perform data recovery and to restore the application.

According to an embodiment of the present invention, the server system executes a monitoring engine configured to obtain information about utilized overwrite reserve space from a reporting engine at the storage system. The monitoring engine executes a fractional space reservation (FSR) policy engine configured to receive, from a system administrator, various criteria (such as thresholds) for executing FSR policies. The FSR policy engine compares utilized overwrite reserve space to a first threshold. If the utilized overwrite reserve space is greater than or equal to the first threshold, the FSR policy engine initiates deletion of backup datasets according to various business rules described herein.

If deletion of the backup datasets cannot prevent the volume from running out of space due to snapshot consumption (e.g., the utilized overwrite reserve space is greater than or equal to the second threshold), the FSR policy engine sends a command to a database engine at the server system to cause data residing on the volume to become inaccessible to a host application. As a result, the host application temporarily stops issuing I/O requests to the storage system. Once the space is added to the volume, the data on the volume becomes accessible to the host application.

Other aspects of the invention will become apparent from the following detailed description taken in conjunction with the accompanying drawings, which illustrate the principles of the invention by way of example.

DETAILED DESCRIPTION

Embodiments of the present invention provide a mechanism by which a server system executing a host application monitors utilization of fractionally reserved overwrite space on a volume storing application data. The server system executes space reservation policies to ensure that the volume cannot run out of space due to snapshot creation. In one implementation, the server system initiates deletion of backup datasets stored on the volume if certain criteria provided by a system administrator are met. A backup dataset may include one or more snapshots of application data. A backup dataset may also include a log of changes to the data and metadata describing the backup dataset. Since deletion of backup datasets on the volume is initiated by the server system, which maintains knowledge about stored backup datasets, the server system may use various rules to decide which backup datasets should be deleted to recover space on the volume and which data needs to be retained. If deleting backup datasets cannot stop the volume from running out of space due to continuous snapshot creation, the server system prevents the host application from temporarily issuing I/O requests to the storage system until space is recovered. An advantage of preventing the host application from issuing I/O requests, rather than failing I/O requests by the storage system, eliminates undesirable consequences, such as loss of data and the need to perform data recovery and to restore the application.

System Architecture

Figure 1:
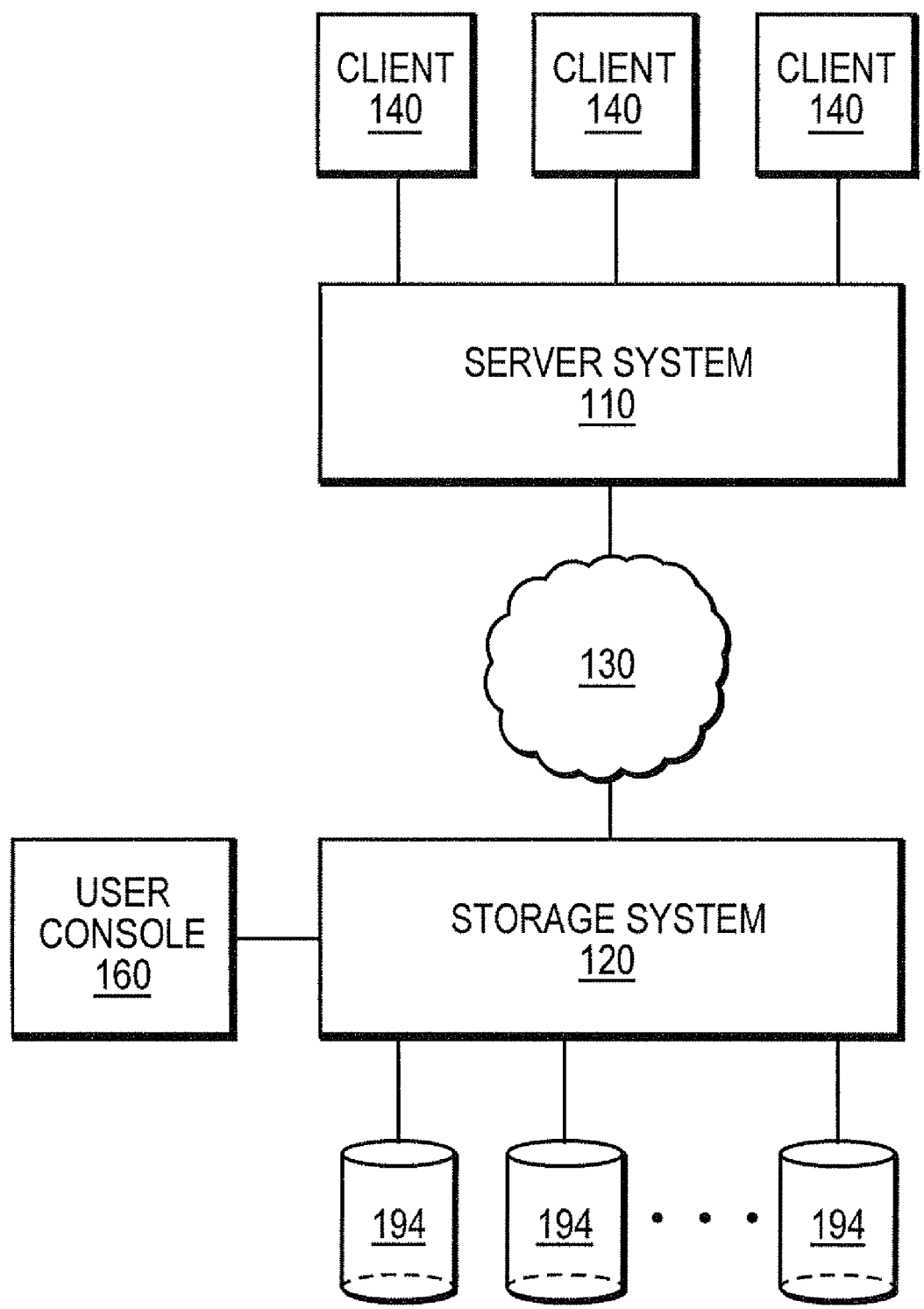
FIG. 1 is a diagram of network environment that includes a storage system and a server system capable of implementing fractional space reservation policies according to an embodiment of the present invention.

In accordance with an embodiment of the present invention, FIG. 1 illustrates a server system 110 that implements fractional space reservation policies according to an embodiment of the present invention and a storage system 120. Server system 110 is connected to multiple clients 140.

Server system 110 is a computer that handles requests for data, electronic mail, file transfers, and other network services from other computers, i.e., clients 140. As will be described in greater detail herein, server system 110 may execute Microsoft™ Exchange Server and Microsoft™ SQL Server, both products provided by Microsoft Corp., of Redmond, Wash. Microsoft Exchange Server is a messaging and collaboration software system that provides support for electronic mail (e-mail) to various clients (such as clients 140) connected to server system 110. Microsoft SQL Server is a relational database management system. A person of ordinary skill in the art would understand that although the present invention is described in the context of Microsoft Exchange Server and Microsoft SQL Server for illustrative purposes only, server system 110 can execute any other application. Server system 110 can be connected to clients 140 over a network, such as a Local Area Network (LAN), Wide Area Network (WAN), or the like.

Server system 110 utilizes services of storage system 120 to store and manage data, such as for example, files, in a set of mass storage devices 194, such as magnetic or optical storage based disks or tapes. As used herein, the word "file" encompasses a container, an object, or any other storage entity. Interaction between server system 110 and storage system 120 can enable the provision of storage services. That is, server system 110 may request the services of the storage system 120, and the storage system 120 may return the results of the services requested by the server system 110, by exchanging packets over the connection system 130. The server system 110 may issue packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Small Computer Systems Interface (SCSI) protocol encapsulated over TCP (iSCSI) and SCSI encapsulated over Fibre Channel (FCP), when accessing information in the form of blocks. Storage system 120 is coupled locally to server system 110 over connection system 130, such as a local area network (LAN), a wide area network (WAN), metropolitan are network (MAN) or the Internet.

As described herein, storage system 120 stores data preferably on one or more writable storage device media, such as magnetic disks, video tape, optical, DVD, magnetic tape, and any other similar media adapted to store information, including data and parity information. However, as illustratively described herein, the information is preferably stored on the disks 194. The disks 194 within a volume are typically organized as one or more groups of Redundant Array of Independent (or Inexpensive) Disks (RAID).

Storage system 110 can be connected to a user console 160, such as a monitor with a keyboard. A user can provision storage space on disks 194 via user console 160. To provision storage space, a user takes into consideration various factors, such as a schedule according to which data will be backed up on disk(s) 194, the retention plan (i.e., how long the data is going to be maintained), whether the data is going to be mirrored, and how often the data on disk(s) is going to change. According to an embodiment of the present invention, a user configures less than 100% for overwrite reserve. As noted herein, overwrite reserve is space reserved to ensure that every block of data can be modified after a snapshot is created on a volume. Overwrite reserve with less than 100% reservation (also referred to herein as "fractional reserve") does not guarantee that every block of data can be modified, yet it makes more space available on the volume for snapshots and other application data. The fractional reserve percentage value can be set between 0 and 99%.

Server System 110

Figure 2A:
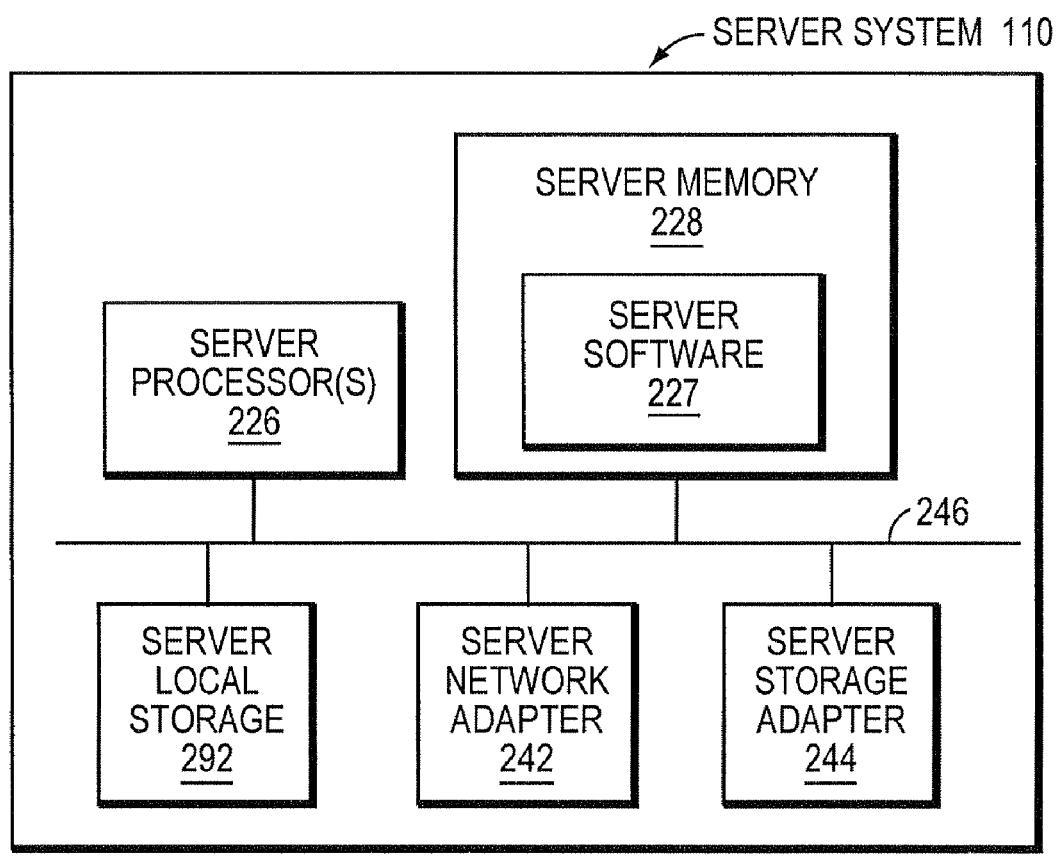
FIG. 2A is a block diagram illustrating various components of the server system shown in FIG. 1 according to an embodiment of the present invention.

Referring now to FIG. 2A, server system 110 comprises server processor(s) 226, server memory 228, a server network adapter 242, a server storage adapter 244, and a local storage 292 coupled by a bus 246.

The server processors 226 are the central processing units (CPUs) of the server system 110 and, thus, control the overall operation of the server system 110. In certain embodiments, the server processors 226 accomplish this by executing software, such as that described in more detail herein. Server processors 226 may include one or more programmable general-purpose or special-purpose microprocessors, digital signal processors (DSPs), programmable controllers, application specific integrated circuits (ASICs), programmable logic devices (PLDs), or the like, or a combination of such devices.

Server memory 228 comprises storage locations that are addressable by the processor 226 and adapters (a server network adapter 242 and a server storage adapter 244) for storing software program code, such as server software 227 and data structures associated with the present invention. The server processor 226 and server adapters may, in turn, comprise processing elements and/or logic circuitry configured to execute the software code and manipulate various data structures. Server memory 228 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

The server network adapter 242 comprises a plurality of ports adapted to couple the server system 110 to one or more clients 140 (shown in FIG. 1) over point-to-point links, wide area networks, virtual private networks implemented over a public network (Internet) or a shared local area network. The server network adapter 242 thus may comprise the mechanical, electrical and signaling circuitry needed to connect the node to the network.

The server storage adapter 244 cooperates with the server operating system 224 executing on the server system 110 to access data from disks 194 (shown in FIG. 1). The server storage adapter 244 comprises a plurality of ports having input/output (I/O) interface circuitry that couples to the disks 194 over an I/O interconnect arrangement, such as a conventional high-performance, fibre channel (FC) link topology.

Server local storage 292 is a device that stores information within server system 110, such as server software 227, server operating system 224, and data. Server system 110 loads server software 227 into server memory 228 from which they are accessed by server processors 226.

Figure 2B:
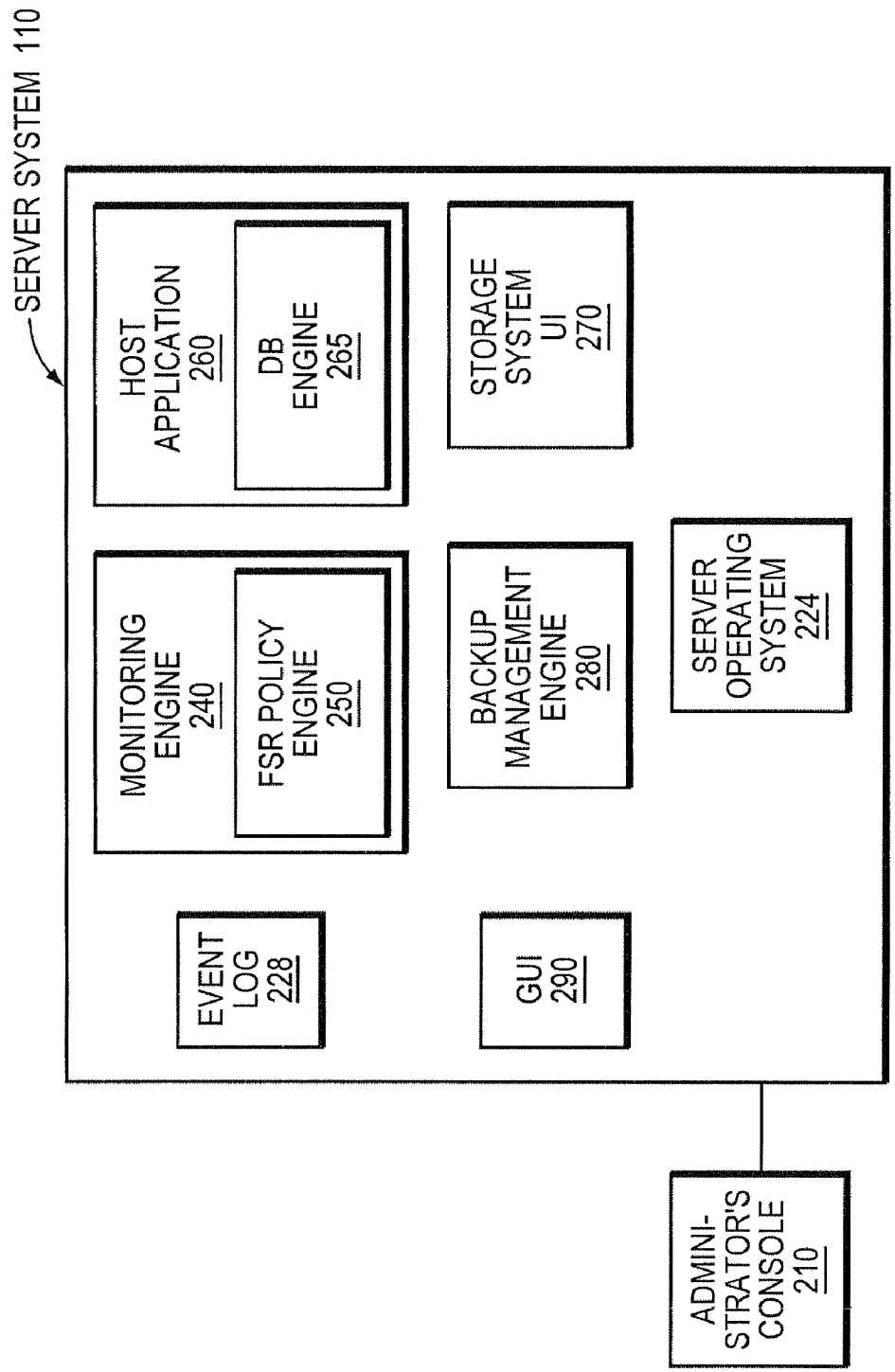
FIG. 2B is a block diagram illustrating various software components executed at the server system shown in FIG. 1 according to an embodiment of the present invention.

Referring now to FIG. 2B, according to embodiments of the present invention, server system 110 executes the following software: a host application(s) 260, a backup management engine 280, a user interface engine 290, a storage system interface engine 270, a monitoring engine 240, a fractional space reservation (FSR) policy engine 250, and a server operating system 224. In one embodiment, these engines are implemented as modules. As used herein, the term "module" refers to computer program code adapted to provide the functionality attributed to the module upon execution by a processor. Host application(s) 260 can be, for example, Microsoft Exchange Server and Microsoft SQL Server, although the present invention contemplates that other host applications can be executed at server system 110. In the case of Microsoft Exchange Server, electronic messages are received from clients 140 by Microsoft Exchange Server and are passed to a database (DB) engine 265. DB Engine 265, in turn, stores the messages on disks 194 as files. As used herein, the term "file" encompasses a container, an object, or any other storage entity.

In Microsoft Exchange Server, a storage group (SG) is a unit for storing data. Each storage group may include a database file and a transaction log, which describes changes made to the database file. Backup management engine 280 causes the storage system 120 to back up storage groups using, for example, snapshot capability. The process of creating snapshots is described in U.S. patent application Ser. No. 10/090,963, entitled "System and Method for Creating a Point-in-time Restoration of Database File," by Dennis Chapman, the contents of which are incorporated by reference herein. Backup management engine 280 also causes storage system 120 to create snapinfo files that are stored on disk(s) 194. A snapinfo file may include information about a particular snapshot. This information may be, for example, a time stamp when a particular snapshot was taken and location where the snapshot is stored on disk(s) 194. A backup dataset includes one or more snapshots of application data. A backup dataset may further include a transaction log of changes to the application data and one or more snapinfo files describing a backup dataset.

As will be described herein in reference to FIG. 3, after backup management engine 280 initiates creation of snapshots by sending a command to storage system 120 via storage system user interface engine 270, storage operating system 330 of storage system 120 (shown in FIG. 3) creates snapshots and snapinfo files. Storage operating system 330 reports back to backup management engine 280 when the operation is completed. Storage system interface engine 270 is configured to act as an interface between server system 110 and storage system 120. Engine 270 communicates with storage system 120 using, for example, Zephyr Application and Programming Interface (ZAPI) protocol. In one implementation, engine 270 is a SnapDrive® for Windows, a product provided by Network Appliance, Inc., of Sunnyvale, Calif.

Server system 110 further executes the monitoring engine 240. Monitoring engine 240 is configured to periodically monitor utilization of the overwrite reserve space on a volume. To this end, storage system interface engine 270 sends a command(s) to reporting engine 334 at the storage system 120 (shown in FIG. 3), which monitors overwrite space utilization on the volume and provides the monitored data storage system interface engine 270. Engine 270, in turn, passes the data to the monitoring engine 240. "Periodically monitoring" as used herein means obtaining information from time to time. A person of ordinary skill in the art would understand that the utilized overwrite reserve space can be expressed in mega bytes (MB), kilo bytes (KB), giga bytes (GB) or in any other measure of computer storage, as well as by a fraction, such as a percentage (for example, if the utilized overwrite reserve space is 50%, it indicates that half of the overwrite reserve space has been used).

Monitoring engine 240 is also configured to periodically gather information about created backup datasets by reading snapinfo files. As was previously described, snapinfo files include information about snapshots, metadata files, a time stamp when a snapshot was taken, and location indicating where the snapshot is stored on disk(s) 194.

FSR policy engine 250 executes fractional space reservation policies according to embodiments of the present invention to prevent a volume(s) storing application data from running out of space. Server system 110 is connected to a system administrator's console 210 through which a system administrator can configure various settings (such as thresholds) that effect execution of space reservation policies by FSR policy engine 250. GUI engine 290 provides, to a system administrator at console 210, a user interface, such as the one shown in FIG. 4 and described in more detail herein. A system administrator can modify the settings via console 210. These settings are provided to the FSR policy engine 250 via GUI engine 290.

In addition, the system administrator performs migration of files to storage system 120 using backup management engine 280, GUI engine 290, monitoring engine 240, and FSR policy engine 250, which are components of SnapManager™ for Microsoft® Exchange and SnapManager™ for Microsoft® SQL Server. To this end, the system administrator physically copies the files from server system 110 to storage system 120. Location of the files (such as a directory path and a volume(s) on which the files reside) is stored in server memory 228. This information is later used by FSR policy engine 250 to implement fractional space reservation policies.

FSR policy engine 250 executes a policy for automatic deletion of backup datasets when a first threshold provided by the system administrator is met. FSR policy 250 further prevents host application 260 from initiating I/O requests to storage system 120 when a second threshold defined by an administrator of the server system 110 has been met. As a result, unlike in prior art implementations, storage system 120 does not fail I/O requests from server system 110 when a volume runs out of space due to creation of snapshots. These policies will be described in greater detail below in reference to FIGS. 4 and 5.

To implement its policies, FSR policy engine 250 maintains a set of business rules. A business rule may include a predicate and an action. Exemplary business rules maintained by FSR policy engine 250 are shown below. A person of ordinary skill in the art would understand that the two rules are shown below for illustrative purposes only, and FSR policy engine 250 may utilize any number of business rules.

IF (most recent backup dataset for the file)
THEN do not delete the backup dataset
IF (backup dataset of a file that does not exist in active file system)
THEN do not delete.

FSR policy engine 250 can also send an event(s) to server operating system 224. Exemplary events are: a first threshold is reached, deletion of backup datasets is initiated, a second threshold is reached, and files are no longer accessible to the host application. These events are stored in an event log 228. FSR policy engine 210 may send similar alerts/notifications to a system administrator at an electronic address(es) provided by the system administrator via console 210.

Various steps for executing fractional space reservation policies will be described below in greater detail in reference to FIGS. 5-7.

Server system 110 further executes the server operating system 224. Server operating system 224 is a program that is, after being initially loaded into server memory 228, manages host applications executed on server system 110. The server operating system 224 can be, for example, UNIX®, Windows NT®, Linux®, or any other general-purpose operating system.

Storage System

Figure 3:
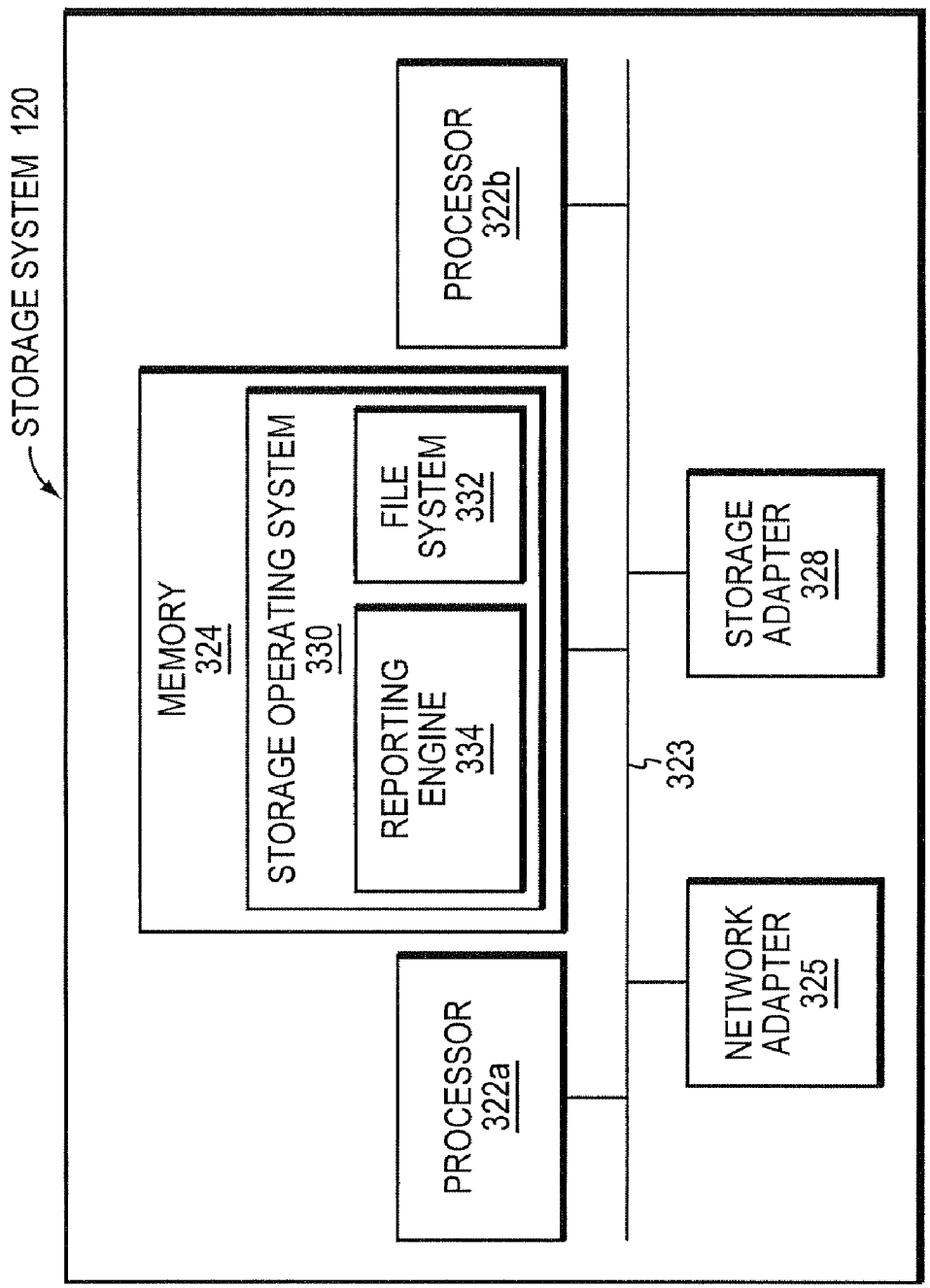
FIG. 3 is a diagram showing architecture of the storage system shown in FIG. 1 according to an embodiment of the present invention.

FIG. 3 is a diagram illustrating various components of the storage system 120, in accordance with an embodiment of the invention. Specifically, the storage system comprises a plurality of processors 322a, b, a memory 324, a network adapter 325, and a storage adapter 328 interconnected by a system bus 323. Storage system 120 executes a storage operating system 330 that preferably implements a high-level module, such as a file system, to logically organize the information as a hierarchical structure of named directories, files and special types of files called virtual disks (hereinafter generally "blocks") on the disks.

The memory 324 comprises storage locations that are addressable by the processors and adapters for storing software program code and data structures associated with the present invention. The processor and adapters may, in turn, comprise processing elements and/or logic circuitry configured to execute the software code and manipulate various data structures. Storage operating system 330, portions of which are typically resident in memory 324 and executed by the processing elements, functionally organizes the storage system 120 by, inter alia, invoking storage operations in support of the storage service implemented by the storage system 120. It will be apparent to those skilled in the art that other processing and memory means, including various computer readable media, may be used for storing and executing program instructions pertaining to the invention described herein. As illustrated herein, storage operating system 330 is preferably the NetApp® Data ONTAP® operating system available from Network Appliance Inc., of Sunnyvale, Calif., that implements a Write Anywhere File Layout (WAFL™) file system. However, it is expressly contemplated that any appropriate storage operating system may be enhanced for use in accordance with the inventive principles described herein to facilitate access to disks. As such, where the term "WAFL" is employed, it should be taken broadly to refer to any storage operating system that is otherwise adaptable to the teachings of this invention. As used herein, the term "storage operating system" generally refers to the computer-executable code operable on a computer that manages data access.

The file system 332 "virtualizes" the storage space provided by the disks. The file system 332 logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored.

Storage operating system 330 further executes a reporting engine 334 configured to periodically monitor utilization of the overwrite reserve space on a volume and to provide the results of the monitoring to engine 240 at server system 110 via storage system interface engine 270. Mechanism for space monitoring is described in a U.S. patent application Ser. No. 11/366,042, entitled "METHOD AND SYSTEM OF AUTOMATICALLY MONITORING A STORAGE SERVER," by Peter L. Smoot, et al, the contents of which are incorporated by reference herein.

The network adapter 325 comprises a plurality of ports adapted to couple storage system 120 to one or more server systems 110 over point-to-point links, wide area networks, virtual private networks implemented over a public network (Internet) or a shared local area network. The network adapter 325 thus may comprise the mechanical, electrical and signaling circuitry.

The storage adapter 328 cooperates with the storage operating system 300 to access information requested by server system 110. The storage adapter 328 comprises a plurality of ports having input/output (I/O) interface circuitry that couples to the disks over an I/O interconnect arrangement, such as a conventional high-performance, FC link topology.

Fractional Space Reservation Policies

Figure 4:
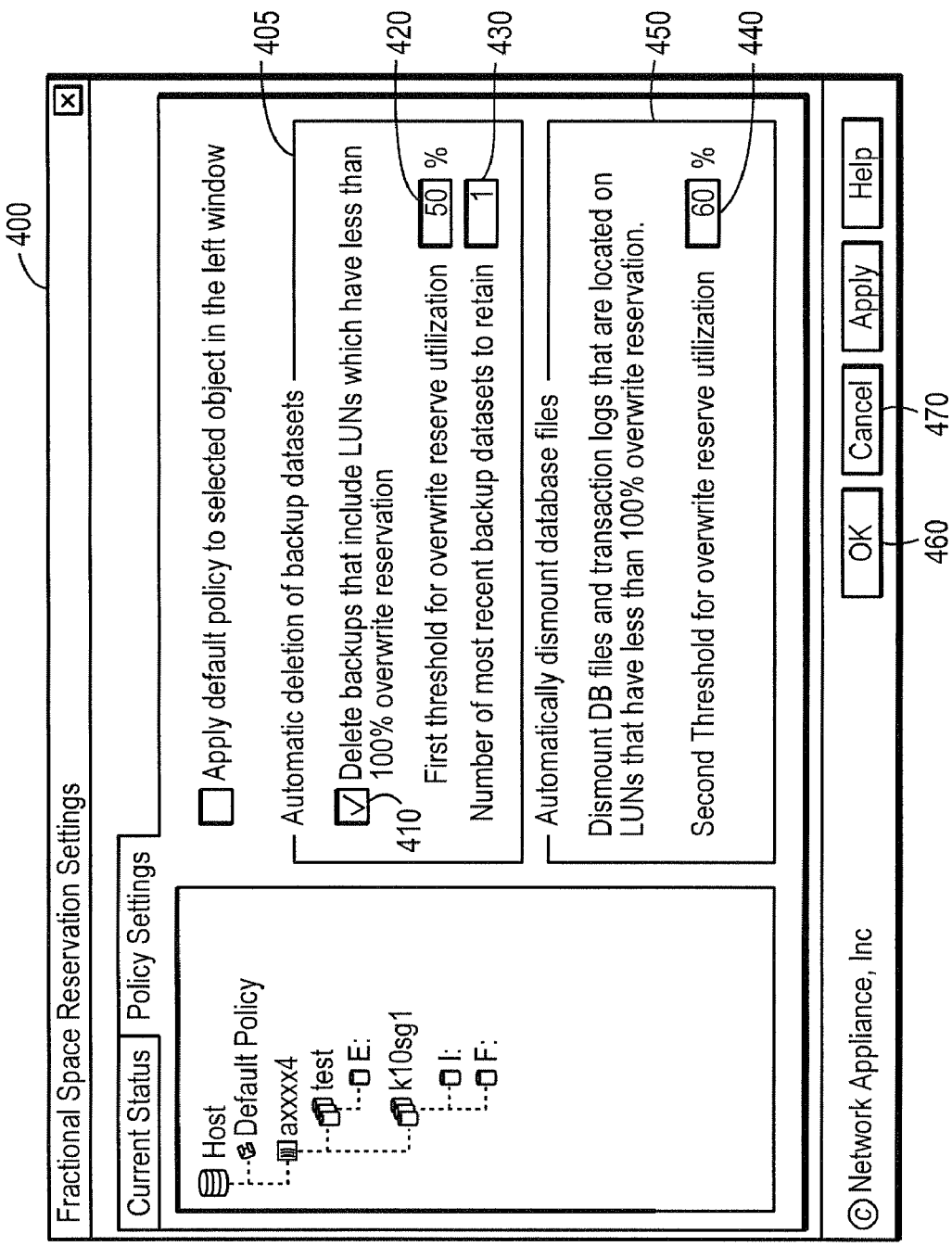
FIG. 4 is a diagram of an exemplary screen presented to a system administrator that allows a user to provide various settings according to an embodiment of the present invention.

FIG. 4 is an exemplary interface 400 provided by user interface engine 190 to a user of server system 110 that allows a system administrator at console 210 to enter various settings used by FSR policy engine 250 to execute fractional space reservation policies. The user interface 400 includes an upper portion 405 and a bottom portion 450. The upper portion 405 allows a system administrator to provide settings to implement a policy of automatic deletion of backup datasets. The bottom portion 450 prompts a system administrator to provide settings for the policy for automatic dismounting of files.

1. Policy for Automatic Deletion of Backup Datasets

A. Enabled/Disabled

By checking box 410, a system administrator at console 210 enables policy for automatic deletion of backup datasets.

B. First Threshold for Overwrite Reserve Utilization

The first threshold for overwrite reserve utilization for the policy of automatic deletion of backup datasets indicates a value at which the policy is activated. A system administrator at console 210 is offered to enter the first threshold in box 420. For example, in FIG. 4, the system administrator at console 210 indicates that the first threshold for overwrite reserve utilization is 50%. Thus, once FSR policy engine 250 determines that 50% of the overwrite reserve space has been utilized, FSR policy engine 250 executes the policy for automatic deletion of backup datasets. The algorithm for automatic deletion of backup datasets will be described in greater detail with reference to FIG. 5. Briefly, FSR policy engine 250 receives, from reporting engine 334 at storage system 120, information regarding utilized overwrite reserve space. FSR policy engine 250 uses this information to determine whether the utilized overwrite reserve space is greater than or equal to a first threshold for overwrite reserve space utilization. In addition, FSR policy engine 250 reads snapinfo files from disk(s) 194, which include information about each backup dataset. FSR policy engine 250 uses this information to determine which backup datasets to delete according to various business rules. For example, the most recent backup dataset for a file is not being deleted. There could be more than one backup dataset for a particular file. FSR policy engine 250 uses a time stamp to identify a most recent backup dataset.

Further, backup datasets for those files that no longer exist within the active file system are not deleted. FSR policy engine 250 determines if a backup dataset has a snapshot of the file that no longer exists. To this end, FSR policy engine 250 uses an Application Interface (API) to identify a list of existing files maintained by the host application 260 and stored on the monitored volume. If a backup dataset includes a snapshot of the file that no longer exists in the active file system, that backup dataset is not deleted. FSR policy engine 250 initiates deletion of backup datasets by sending a command, via engine 270, to storage operating system 330. Storage operating system 330 receives the command and deletes the backup datasets on a volume running out of space according to the predefined business rules.

C. Number of Most Recent Backup Datasets to Retain.

A number of most recent backups to retain indicates a number of backup datasets that the system administrator chose to keep. The system administrator may enter the number of backup datasets to retain in box 430. In FIG. 4, illustratively, the system administrator entered "1" in box 430 indicating that he or she wants to keep one most recent backup dataset.

2. Policy for Automatic Dismounting of Files

The system administrator may also enter a second threshold for overwrite reserve space utilization in box 440 to enable the policy for automatic dismounting of files residing on the volume running out of space. When the second threshold is reached, the policy is activated. According to this policy, FSR policy engine 250 makes a call to DB engine 265 to dismount files stored on the monitored volume. Dismounting of a file involves making a particular file inaccessible by a host application. As a result, host application 260 does not issue any I/O requests to the dismounted files. Dismounting files is one example of the mechanism for preventing data from being written to the volume. A person of ordinary skill in the art would understand that other policies can be implemented to prevent data from being written to the volume.

At any time, a system administrator has an option to confirm the settings by pressing "OK" button 460. As a result, FSR policy engine 250 accepts the settings. Alternatively, a system administrator can cancel the settings by pressing "Cancel" button 470. GUI engine 290 passes the settings to FSR policy engine 250, which, in turn, uses the settings to execute fractional space reservation policies. A system administrator can change the settings at any time.

Figure 5:
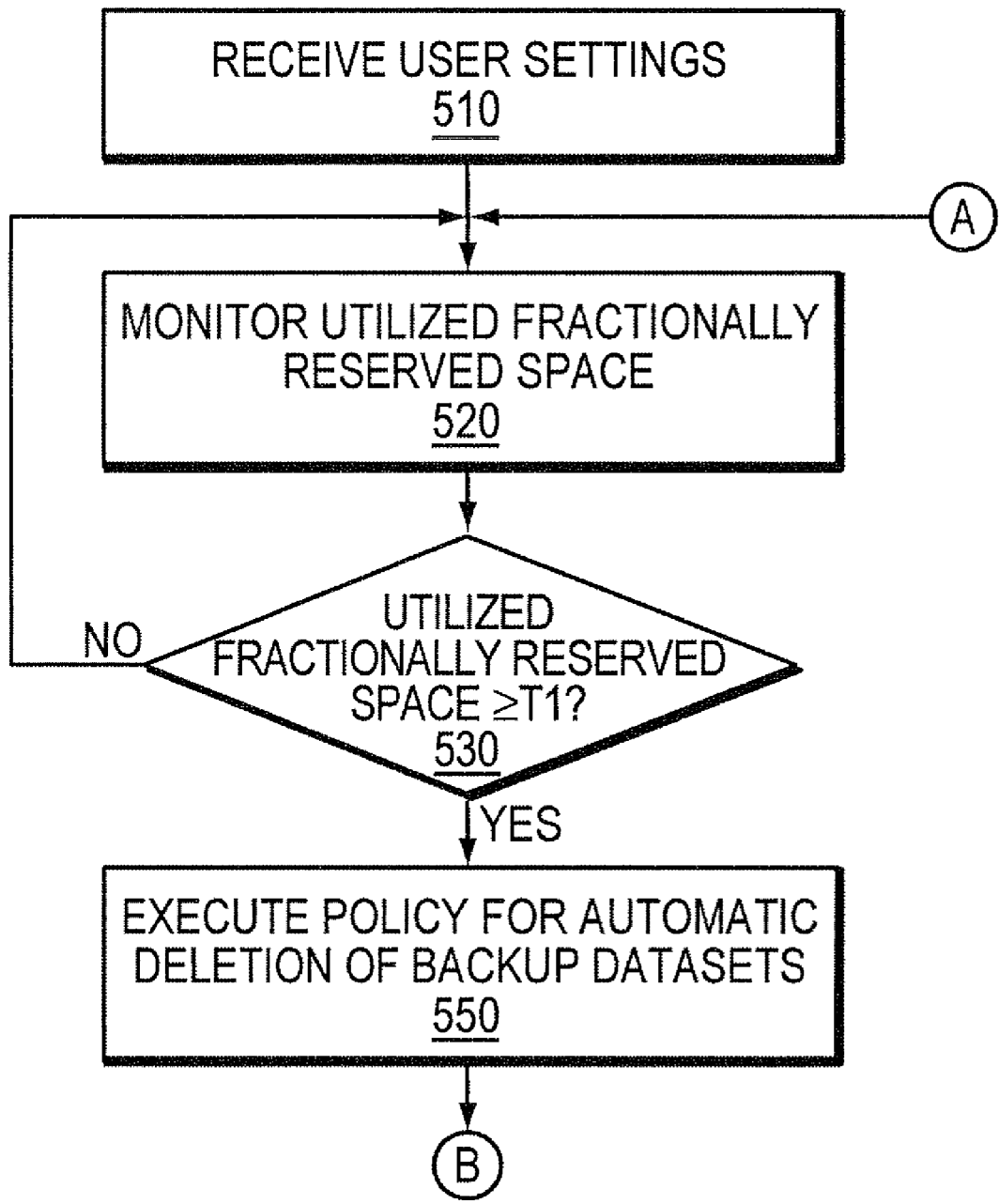
FIG. 5 is a flow diagram of steps performed to execute fractional space reservation policies according with an embodiment of the present invention.

Referring now to FIG. 5, it illustrates a flowchart of operations to execute fractional space reservation policies according to an embodiment of the present invention. Initially, at step 510, FSR policy engine 250 receives user settings for automatic deletion of backup datasets policy and the settings for the policy for automatic dismount of files. As was described in greater detail in connection with FIG. 4, exemplary settings provided by a system administrator are a first threshold, a second threshold, and a number of most recent backup datasets to retain.

At step 520, monitoring engine 240 gathers information about utilized overwrite reserve space on the monitored volume, via storage system interface engine 270. In one embodiment, engine 270 issues a command to reporting engine 334 at storage system 120. Reporting engine 334, which monitors space utilization at the storage system 120, provides space utilization data to monitoring engine 240 upon the request. At step 530, monitoring engine 240 uses the settings received by FSR policy engine 250 and space utilization data to determine whether the utilized overwrite reserve space is greater than or equal to the first threshold. If the utilized overwrite reserve space is less than the first threshold, monitoring engine 240 loops back to step 520 and continues to periodically gather, from reporting engine 334, information about utilization of overwrite reserve space on the volume. Alternatively, if the utilized overwrite reserve space is greater or equal than the first threshold, FSR policy engine 250 executes, at step 550, policy for automatic deletion of backup datasets, as described herein in more detail in reference to FIG. 6.

Figure 6:
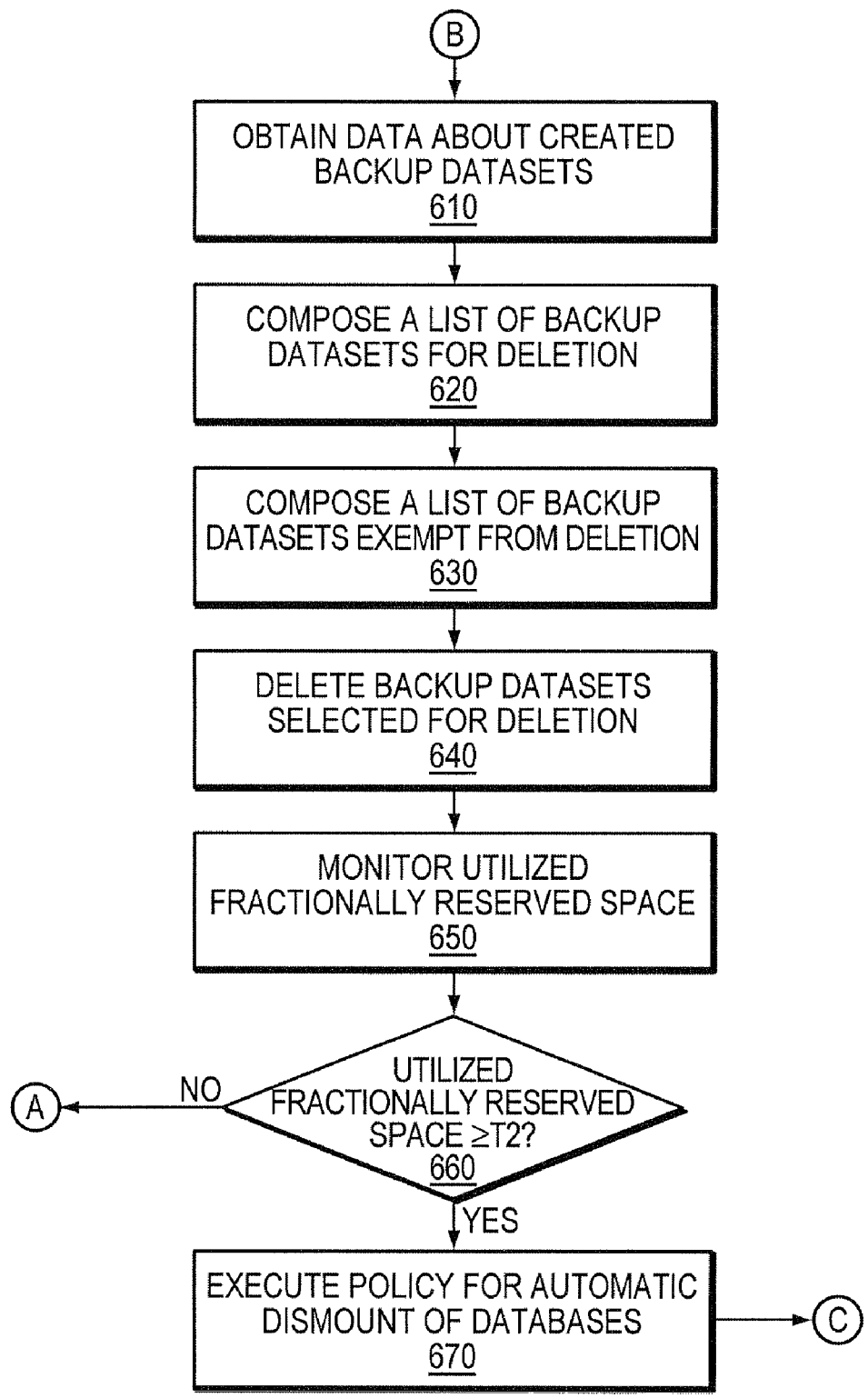
FIG. 6 is a flow diagram of steps performed to execute a policy for automatic deletion of backup datasets according to an embodiment of the present invention.

Referring now to FIG. 6, it illustrates a flow diagram of steps performed by monitoring engine 240 and FSR policy engine 250 to execute policy for automatic deletion of backup datasets. The process begins 610 with the monitoring engine 240 obtaining information regarding created backup datasets.

In one implementation, FSR policy engine 250 reads snapinfo files stored on disk(s) 194. A snapinfo file includes information about a snapshot, a time stamp when a snapshot was taken, where the snapshot is stored on disk(s) 194, and which files are part of a backup dataset. FSR policy engine 250 uses this information to determine which backup datasets to delete according to various business rules.

At step 620, FSR policy engine 250 composes a list of backup datasets residing on a volume running out of space. At step 630, FSR policy engine 250 composes a list of backup datasets exempt from deletion. For example, the most recent backup dataset for a file is not being deleted.

Further, as was noted herein, backup datasets for those files that no longer exist in the active file system are not deleted. FSR policy engine 250 determines if it has snapshots for the files that no longer exist. To this end, FSR policy engine 250 uses an Application Interface (API) to identify a list of existing files maintained by the host application 260. If a backup dataset includes a snapshot(s) of a file that no longer exists, that backup dataset is not deleted.

At step 640, FSR policy engine 250 initiates deletion of the backup datasets other than those backup datasets that are exempt from deletion. FSR policy engine 250 uses the number of backup datasets to retain provided by the system administrator to delete backup datasets in excess of that number. To delete the backup datasets, FSR policy engine 250 sends a command, via engine 270, to storage operating system 330 at storage system 120. Storage operating system 330 receives the command and deletes the backup datasets on a volume running out of space. As a result of the deletion of backup datasets, more space becomes available on the volume.

Still referring to FIG. 6, once backup datasets selected for deletion have been deleted, monitoring engine 240 continue at step 650 to gather information about utilization of overwrite reserve space. FSR policy engine 250 receives the information from monitoring engine 240 and compares the utilized overwrite reserve space with the second threshold (T2) at step 660. If the utilized overwrite reserve space is less than the second threshold, the process loops back to step 520 described in connection with FIG. 5. Alternatively, if the utilized overwrite reserve space is greater than or equal to the second threshold, FSR policy engine 250 executes 670 the policy for automatic dismounting of files residing on a volume.

Figure 7:
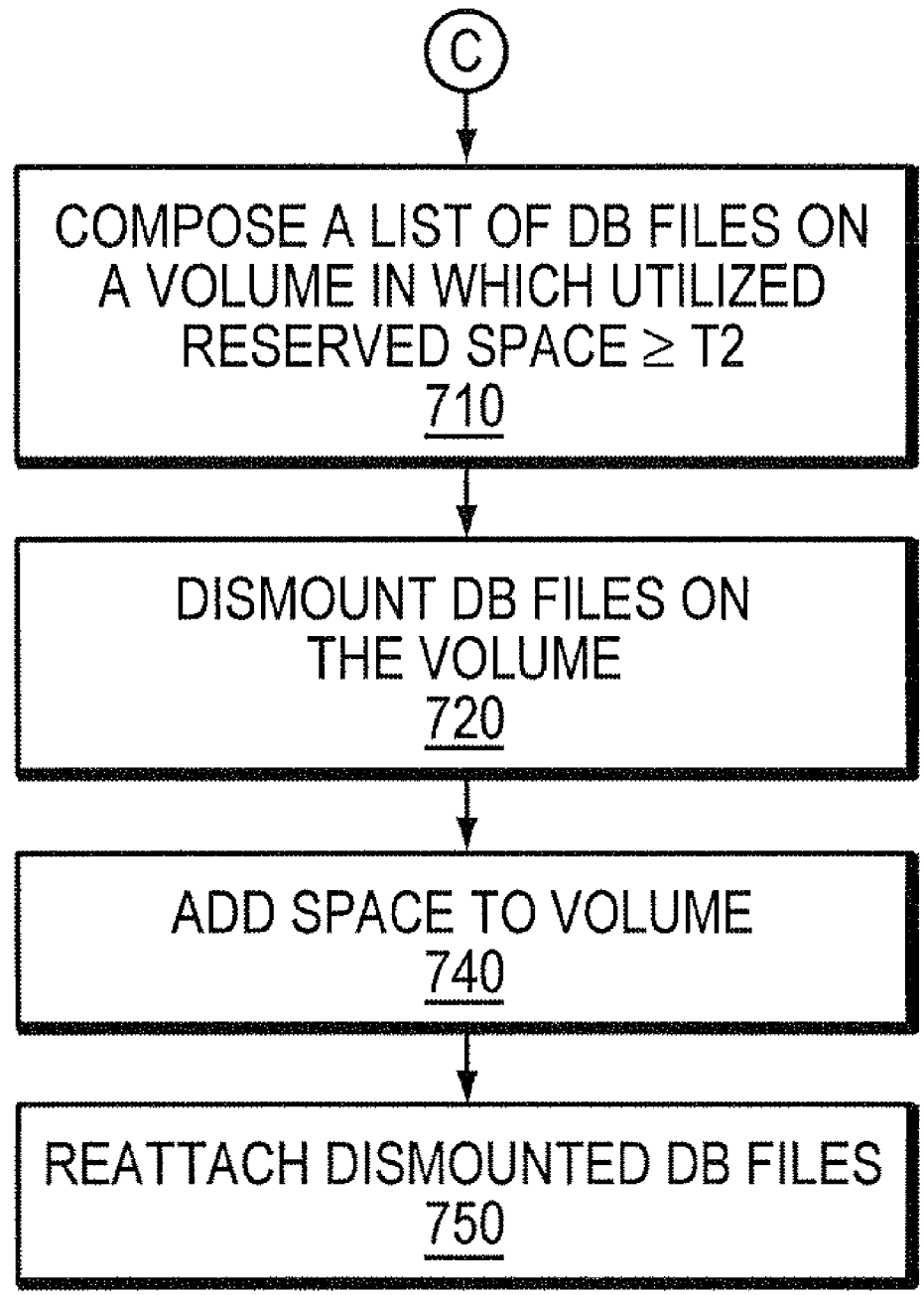
FIG. 7 is a flow diagram of steps performed to execute a policy for automatic dismounting of files according to an embodiment of the present invention.

Referring now to FIG. 7, it illustrates a flow diagram of operations for executing the policy for automatic dismounting of files. The process begins by FSR policy engine 250 composing 710 a list of files residing on the volume on which the utilized overwrite reserve space exceeds the second threshold. Location of the files (such as a directory path and volume information) is stored in server memory 228. FSR policy engine 250 performs a memory lookup to obtain a list of those files stored on the volume running out of space.

At step 720, FSR policy engine 250 sends a command(s) to DB engine 265 to dismount the files on the volume running out of space. In one implementation, the files are dismounted serially (e.g., one after another). In another implementation, the files are dismounted concurrently. FSR policy engine 250 stores a list of the dismounted files in the server memory 228. In addition, the list is persisted to disks 194 and is stored in a disk memory (not shown). FSR policy engine 250 then verifies that the files are dismounted.

Once the files have been dismounted, space is added to the volume, at step 740. In one implementation, a storage system administrator uses console 160 to add more space to the volume from which files were detached. In another embodiment, the space is added automatically via, for example, AutoGrow feature, provided by Network Appliance, Inc., of Sunnyvale, Calif. According to AutoGrow feature, after storage resources have been allocated to host application(s), such as host application 260, remaining storage is virtualized into a common pool and then allocated as needed according to policies set by a user. The feature dynamically provisions additional storage from the virtualized pool, ensuring that host applications have sufficient space. A person of ordinary skill in the art would understand that other mechanisms are available to add space to the volume. Once space has been added to the volume, the system administrator makes the files accessible to host application(s) 260 at step 750.

In another embodiment, rather than making the files inaccessible, FSR policy engine 250 sets the files on the volume to a read-only mode by enabling a "Database (DB) Read-Only" option. As a result, clients' read access requests can be served. In contrast, write access requests are not allowed until space has been recovered on a volume. Then FSR policy engine 250 makes the files accessible to host application(s) 260 for writing data.

Thus, according to the present invention, a server system executing a host application(s) monitors utilization of fractionally reserved overwrite space on a volume. The server system executes space reservation policies to ensure that the volume storing application data, such as files, cannot run out of space due to snapshot creation. In one embodiment, if utilized overwrite reserve space on a volume is below a predetermined criteria, the server system initiates deletion of a backup dataset(s), which include one or more snapshots of a file. Since deletion of backup datasets on the volume is initiated by the server system, which maintains knowledge about stored backup datasets, the server system may use various rules to decide which datasets can be deleted to recover space on the volume and which data needs to be retained. In addition, the server system can prevent the host application from issuing I/O requests to the storage system if deletion of backup datasets did not preclude the volume from running out of space due to continuous snapshot creation. An advantage of preventing the host application from issuing I/O requests, rather than failing I/O requests by the storage system, eliminates undesirable consequences, such as performing data recovery and restoring the application.

Although the present invention for purpose of explanation has been described with reference to specific exemplary embodiments, it will be understood that the invention is not limited to the embodiments described herein. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated. Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Moreover, the teachings of this invention can be adapted to a variety of storage system architectures including, but not limited to, a network-attached storage environment and a storage area network. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A system for monitoring utilization of fractionally reserved overwrite space on a volume, comprising:
    a processor configured to execute a fractional space reservation (FSR) policy engine, the FSR policy engine configured to monitor utilization of the fractionally reserved overwrite space on the volume;
    in response to the utilization of the fractionally reserved overwrite space on the volume reaching a first threshold, a storage system further configured to delete one or more backup data sets of the fractionally reserved overwrite space; and
    in response to the utilization of the fractionally reserved overwrite space on the volume reaching a second threshold, the storage system further configured to prevent a host application from issuing a write request to the storage system.

2. The system of claim 1, wherein the storage system is configured to dismount one or more storage entities of the storage system to prevent the host application from issuing the write request.

3. The system of claim 2, further comprising a user interface (UI) configured to allow a system administrator to enter the first threshold, the second threshold, and a number indicating how many backup datasets to retain on the volume.

4. The system of claim 2, wherein the one or more storage entities are dismounted serially.

5. The system of claim 1, further comprising a backup management engine configured to create one or more backup datasets.

6. The system of claim 1, wherein the FSR policy engine is executed by a server system.

7. The system of claim 1, wherein the volume comprises one or more disks.

8. The system of claim 1, wherein the FSR policy engine is further configured to send a request to the storage system to retain a backup dataset for a portion of data that no longer exists in an active file system of the storage system.

9. The system of claim 1, wherein the FSR policy engine is further configured to send a request to the storage system to retain a most recent backup dataset for a portion of data.

10. The system of claim 1, wherein the backup dataset comprises one or more persistent point-in-time images of data.

11. The system of claim 1, further comprising a reporting engine configured to provide information about the utilized space to the FSR policy engine.

12. The system of claim 1, wherein the FSR policy engine is further configured to set at least a portion of the volume to a read-only mode.

13. The system of claim 1, wherein the storage system is further configured to virtualize remaining storage into a common pool.

14. A method for monitoring utilization of fractionally reserved overwrite space on a volume, comprising:
    monitoring, by a processor executing a policy engine, utilization of the fractionally reserved overwrite space on the volume;
    in response to the utilization of the fractionally reserved overwrite space on the volume reaching a first threshold, deleting one or more backup data sets of the fractionally reserved overwrite space; and
    in response to the utilization of the fractionally reserved overwrite space on the volume reaching a second threshold, preventing a host application from issuing a write request to the storage system.

15. The method of claim 14, further comprising dismounting one or more storage entities of the storage system to prevent the host application from issuing the write request.

16. The method of claim 15, wherein the one or more storage entities are dismounted serially.

17. The method of claim 14, further comprising sending a request to the storage system to retain a backup dataset for a portion of data that no longer exists in an active file system of the storage system.

18. The method of claim 14, further comprising sending a request to the storage system to retain a most recent backup dataset for a portion of data.

19. The method of claim 14, further comprising:
prompting, by a user interface, settings to select for the first threshold, the second threshold, and a number of backup datasets to retain.

20. The method of claim 14, further comprising:
adding space to the volume; and
in response to adding the space to the volume, allowing the host application to issue the write request to one or more storage entities of the storage system.

21. The method of claim 14 further comprising setting at least a portion of the volume to a read-only mode.

22. The method of claim 14 further comprising virtualizing remaining storage into a common pool.

23. A method for monitoring utilization of fractionally reserved overwrite space on a volume, comprising:
monitoring utilization of the fractionally reserved space on the volume by a server system executing a host application;
determining a first threshold indicating a value above which utilization of the overwrite reserve space is disallowed;
determining a second threshold indicating a value above which a host application is prevented from issuing a write request to one or more storage entities of a storage system;
in response to reaching the first threshold, deleting one or more backup data sets of the fractionally reserved overwrite space; and
in response to reaching the second threshold, preventing the host application from issuing the write request to the storage system.

24. The method of claim 23, further comprising: dismounting one or more storage entities of the storage system to prevent the host application from issuing the write request.

25. The method of claim 24, further comprising:
determining a value indicating a number of most recent backup datasets to retain;
reaching the first threshold; and
in response to reaching the first threshold, sending a request to the storage system to refrain from deleting one or more most recent backup datasets.

26. The method of claim 24, wherein the one or more storage entities are dismounted concurrently.

27. The method of claim 23 further comprising setting at least a portion of the volume to a read-only mode.

28. The method of claim 23 further comprising virtualizing remaining storage into a common pool.

29. A computer readable storage medium containing executable program instructions executed by a processor, comprising:
program instructions that monitor utilization of fractionally reserved overwrite space on a volume;
program instructions that delete, in response to the utilization of the fractionally reserved overwrite space on the volume reaching a first threshold, one or more backup data sets of the fractionally reserved overwrite space; and
program instructions that prevent, in response to the utilization of the fractionally reserved overwrite space on the volume reaching a second threshold, a host application from issuing a write request to the storage system.

30. The computer readable storage medium of claim 29, further comprising program instructions that dismount one or more storage entities of the storage system to prevent the host application from issuing the write request.

* * * * *